United States Patent
Woodward

(10) Patent No.: US 11,806,708 B2
(45) Date of Patent: Nov. 7, 2023

(54) DROPLET DISPENSER

(71) Applicant: TTP PLC, Royston (GB)

(72) Inventor: Adrian Woodward, Royston (GB)

(73) Assignee: TTP Plc, Royston (GB)

( * ) Notice: Subject to any disclaimer, the term of this patent is extended or adjusted under 35 U.S.C. 154(b) by 59 days.

(21) Appl. No.: 17/255,491

(22) PCT Filed: Jun. 25, 2019

(86) PCT No.: PCT/GB2019/051792
§ 371 (c)(1),
(2) Date: Dec. 23, 2020

(87) PCT Pub. No.: WO2020/002903
PCT Pub. Date: Jan. 2, 2020

(65) Prior Publication Data
US 2021/0276005 A1    Sep. 9, 2021

(30) Foreign Application Priority Data

Jun. 27, 2018    (GB) .................................... 1810546

(51) Int. Cl.
*B01L 3/02* (2006.01)
*B05C 5/02* (2006.01)
(Continued)

(52) U.S. Cl.
CPC .......... *B01L 3/0265* (2013.01); *B05C 5/0225* (2013.01); *G01F 11/021* (2013.01);
(Continued)

(58) Field of Classification Search
CPC ............ B05B 11/3001; B05B 11/3004; B01L 3/0265; B01L 2200/0605;
(Continued)

(56) References Cited

U.S. PATENT DOCUMENTS 5,433,351 A * 7/1995 Okuyama ................ B67D 1/10
417/413.2
5,497,944 A    3/1996 Weston et al.
(Continued)

FOREIGN PATENT DOCUMENTS

WO    0037179 A1    6/2000
WO    0228534 A1    4/2002

OTHER PUBLICATIONS

PCT/GB2019/051792 International Search Report and Written Opinion dated Aug. 2, 2019.

*Primary Examiner* — Vishal Pancholi
*Assistant Examiner* — Robert K Nichols, II
(74) *Attorney, Agent, or Firm* — Erise IP, P.A.

(57) ABSTRACT

A droplet dispenser comprises a chamber (3) with a fluid inlet valve (2) and a fluid outlet valve (4). The chamber (3) is arranged such that the volume of the chamber may be varied in use to cause fluid to be alternately drawn in to the chamber (3) through the inlet valve (2) then subsequently expelled from the chamber through the outlet valve (4) to dispense a droplet. The droplet dispenser is capable of dispensing from an open reservoir and one may change the dispensed drop volume simply and easily. The droplet dispenser can also handle liquids which are normally seen as difficult to dispense, such as cyanoacrylate adhesives.

20 Claims, 6 Drawing Sheets

(51) Int. Cl.
  *G01F 11/02*   (2006.01)
  *G01F 11/08*   (2006.01)
(52) U.S. Cl.
  CPC ..... *G01F 11/088* (2013.01); *B01L 2200/0605* (2013.01); *B01L 2400/0481* (2013.01); *B01L 2400/0616* (2013.01)
(58) Field of Classification Search
  CPC ..... B01L 2400/0481; B01L 2400/0616; B05C 5/0225; G01F 11/021; G01F 11/088
  See application file for complete search history.

(56) References Cited

U.S. PATENT DOCUMENTS

| | | | |
|---|---|---|---|
| 5,967,377 A | 10/1999 | Glynn | |
| 6,911,181 B1 * | 6/2005 | McNeil | B01L 3/0265 436/179 |
| 7,128,032 B2 * | 10/2006 | Froeschle | H02K 41/031 123/90.11 |
| 2013/0026191 A1 | 1/2013 | Duquet et al. | |
| 2013/0200110 A1 * | 8/2013 | Lee | B65D 83/0061 222/321.6 |

* cited by examiner

DROPLET DISPENSER

RELATED APPLICATIONS

The present application is a national stage application under 35 U.S.C. § 371 of International Application No. PCT/GB2019/051792, filed 25 Jun. 2019, which claims priority to Great Britain Patent Application No. 1810546.0, filed 27 Jun. 2018. The above referenced applications are hereby incorporated by reference into the present application in their entirety.

BACKGROUND

This invention relates to a dispenser system for individual fluid droplet dispensing.

Such dispensers are well known in the art. For example, EP 1,344,565 and GB 2,511,644 describe systems and methods for dispensing individual droplets of fluid from a closed volume reservoir comprising a sliding piston within a tube (such as a syringe). Droplets are ejected from the system by applying an impulse of energy to the piston forcing it along the tube with sufficient energy to eject a droplet of fluid from a dispense tip. This system has two main drawbacks. Firstly, the dispensed droplet volume is related to the total volume of the reservoir such that a small reservoir is required to achieve a dispense of small droplets (each droplet equates to approximately 1000th of the volume of the reservoir). Similarly, to dispense larger droplets, the reservoir is proportionally larger, thus if a change in drop size is required, it is necessary to change the whole reservoir. Secondly, the number of droplets that can be dispensed is limited to the volume of the reservoir.

Furthermore, the dispensing of some materials, for example cyanoacrylate adhesives or 'Superglues', poses a particular challenge to conventional adhesive dispensing systems. Conventional systems typically contain sliding seal elements that are readily bonded by such adhesives which then require these dispensing systems to be either striped and cleaned or even replaced. Other types of dispense systems for cyanoacrylate adhesives require the dispensing tip to be brought in to actual contact with the substrate to transfer the adhesive physically, thus limiting the applications to where direct substrate contact is possible.

It is the objective of this invention to address the limitations outlined above.

According to the present invention there is provided a droplet dispenser comprising a chamber with a fluid inlet valve and a fluid outlet valve, the chamber being arranged such that the volume of the chamber may be varied in use to cause fluid to be alternately drawn in to the chamber through the inlet valve then subsequently expelled from the chamber through the outlet valve to dispense a droplet.

As well as addressing the limitations discussed above, the present invention has a number of advantages. For example, the invention allows the volume that is dispensed to be controlled by energy input, allowing simple and accurate control. Further, by employment of a reservoir and dual valving arrangement it is possible for the invention to dispense liquids of a range of viscosities (1-700 Cp), and also to hold low surface tension liquids. The simple nature of this construction also enables low cost manufacture which can enable the provision of a dispenser with disposable components.

As the dispenser has no sliding wetted elements it can handle liquids which are normally difficult to dispense, such as Cyanoacrylates. This means that it can be employed in a wide range of sectors, including industrial manufacturing, consumer dispensing and medical device operation.

As will be appreciated, one advantage of the invention is that rather than dispense a proportion of a fixed volume, the proposed system is capable of dispensing from an open reservoir thus facilitating the dispense of many 1000s of drops without having to change a consumable. The system is also capable of changing the dispensed drop volume simply and easily.

BRIEF DESCRIPTION OF THE DRAWINGS

Examples of the present invention will now be described with reference to the accompanying drawings, in which.

DETAILED DESCRIPTION

Throughout this specification, specific types of valve are described as preferred for various embodiments. The skilled person will appreciate that other forms of valve structure that provide a unidirectional flow are equally applicable to the invention to control the flow of fluid into and out of the chamber.

Figure 1:
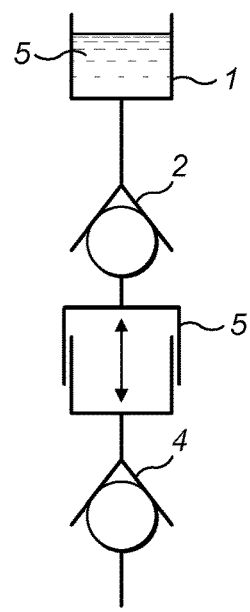
FIG. 1 is a side schematic view of an example dispenser according to the invention.

Referring to FIG. 1 there is shown, schematically, components of a system according to the invention. A fluid reservoir 1 is attached to an upper valve 2. The upper valve 2 forms an entrance to a chamber 3, the volume of which may be varied. A lower dispense valve 4 forms an exit from the chamber 3.

The chamber 3 is formed in such a manner that its volume may be altered. By way of example, the chamber may be formed by a movable piston within a cylinder or deformable walls, its volume being changed by elastic deformation of the chamber walls.

The dispenser system may be mounted on an external control component that can be powered pneumatically, mechanically, electrically or by some other motive force to cause a change in the chamber volume.

Figure 9:
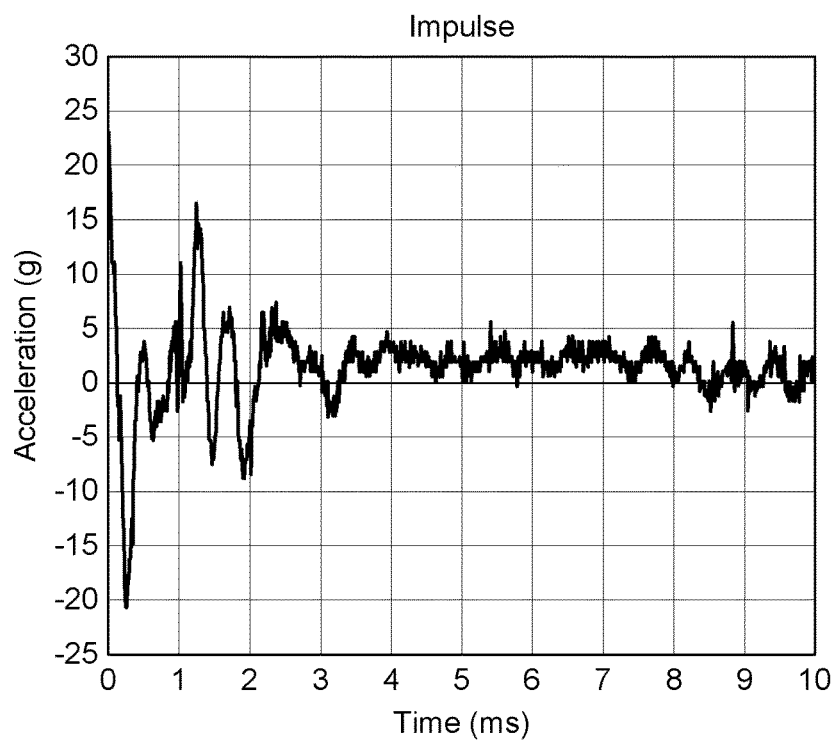
FIG. 9 shows a typical system drive impulse.

The operation of the dispenser system of the invention will now be described. As the volume of the chamber 3 is increased, fluid 5 is drawn in through the upper valve 2 into the chamber 3, the lower valve 4 remaining closed. When the volume of the chamber is reduced, the upper valve 2 is forces closed and fluid (being incompressible) is forced out through the dispense valve 4. Initiating a rapid change in volume of the chamber by the application of an impulse of energy causes said impulse to be transmitted through the body of the fluid within the chamber. This impulse continues through the outlet valve 4 and onwards to the dispense tip 5 where the impulse caused a droplet of fluid to be ejected from the dispense tip. Varying the magnitude of the impulse of energy enables the size of ejected droplet to be varied in proportion to the size of the impulse. An example of a typical energy impulse is shown in FIG. 9 where the magnitude is approximately ±25 g and the duration is in the order of 5 ms. The duration and magnitude of the pulse may be optimised for a particular valve and chamber geometry and for a particular fluid viscosity. For a higher viscosity fluid, say in the range of 500-1000 Cp, the magnitude might be in the order of 100 g and the duration approximately 500 ms. FIG. 9 also shows some 'ringing' artefacts following the main impulse. Optimising the drive system and chamber construction to dampen out such artefacts may be beneficial in maximising the system efficiency. The cycle may then be repeated in order to cause a sequence of droplets to be ejected.

Figure 2:
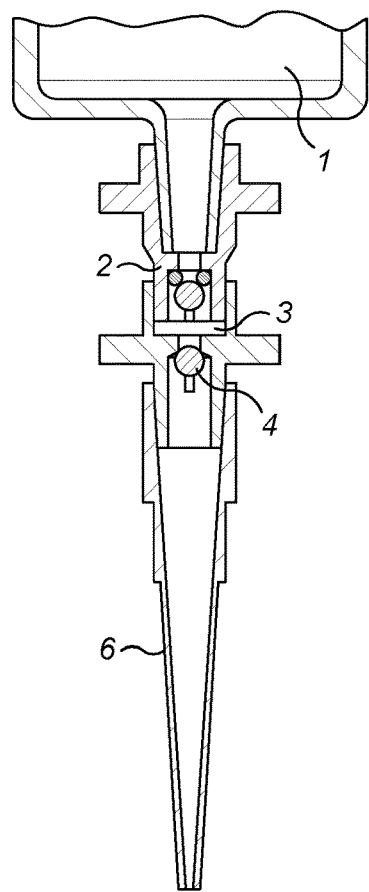
FIG. 2 is a side cross-sectional view of a further example of the present invention.

One particular embodiment of the dispenser system of the invention is shown in FIG. 2 by way of example. The upper valve 2 is shown as a one-way ball valve assembly 2 leading from a reservoir 1. The chamber 3 is formed between the upper valve 2 and the dispense valve 4. The volume of the chamber 3 may be varied by the relative position of the upper valve 2 and the lower valve 4. Fluid exits the dispense valve 4 into a dispense tip 5.

Figure 3C:
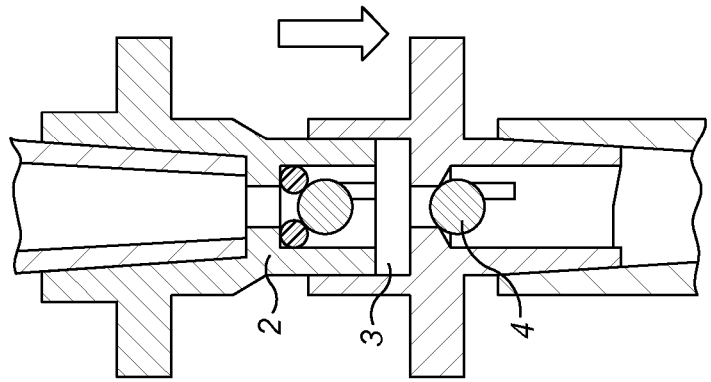
FIG. 3*a-c* is a side cross-sectional view of the example of FIG. 2 at different stages during its dispensing operation.
Figure 3B:
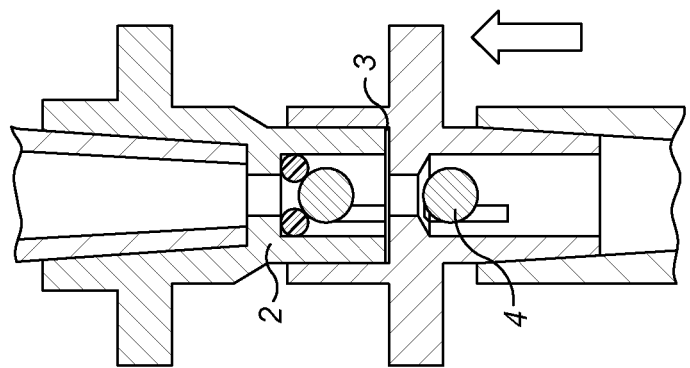
Figure 3A:
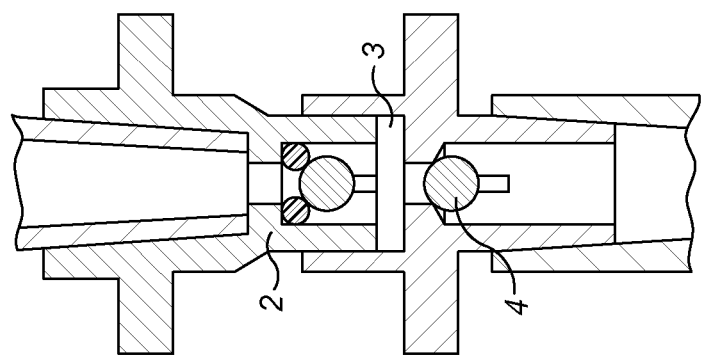

FIG. 3 shows the sequence of operation of the dispenser system. The application of an impulse of energy to the dispense valve 4 in an upward direction, the upper valve 2 closes and the chamber volume is reduced forcing the fluid past the dispense valve 4 and in to the dispense tip 5 from where it is ejected. The dispense valve 4 then returns downwards, for example driven be a return spring (not shown), the elastic nature of the chamber or by driving the device in the reverse direction, and draws a further volume of fluid in to the chamber 3 ready for the next dispense. The volume of dispense can be controlled either by the energy input during generation of the up stroke, or by the duration of the stroke or by a combination of the two. As the dispenser system requires only small movements of the two valves to dispense, the delivery frequency can be relatively high.

Some key features of the dispenser are:
  It can be low cost provided by a module connected to the fluid reservoir 11;
  It employs an external actuator/energy input which simplifies construction;
  It can be configured to be one-time use disposable;
  It is easy to set-up and has no priming steps; and
  It can be controlled via either positive displacement or energy input.

Figure 4:
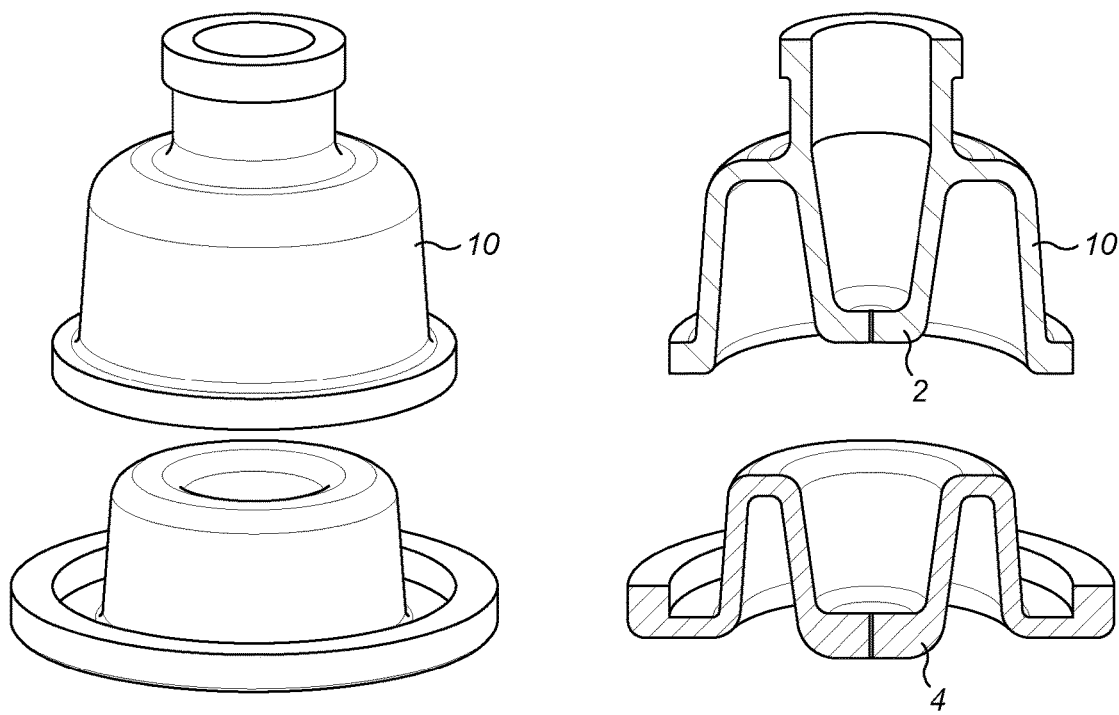
FIGS. 4 and 5*a-b* are side cross-sectional views of an alternative valve and chamber construction that may be employed in the present invention.
Figures 5A, 5B:
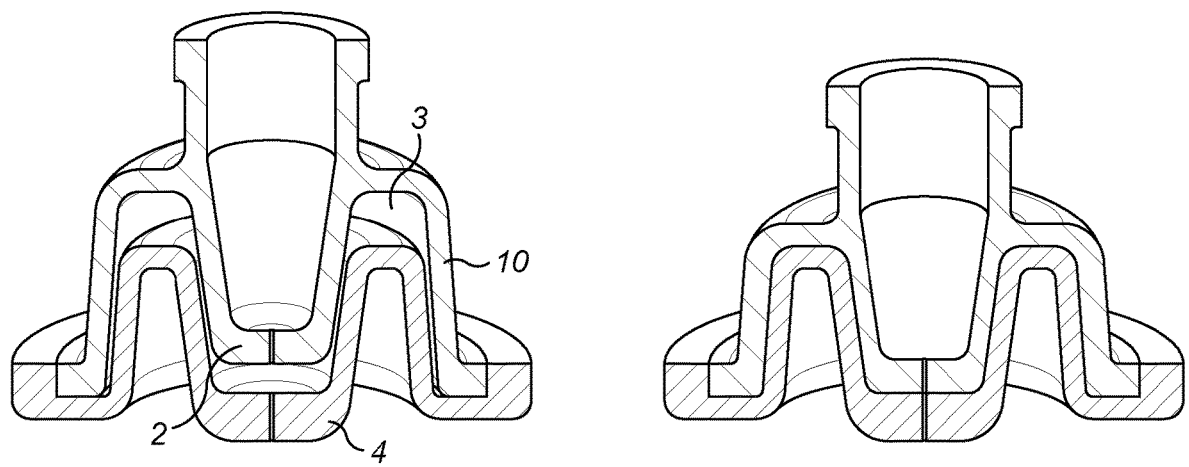

A further example of the invention uses elastomeric slit valves whose relative motion is of a compliant or possibly rolling diaphragm nature. Unlike ball valves the slit valves comprise a single component with no separate moving parts thus enabling the possibility of dispensing difficult materials such as Cyanoacrylates where a sliding seal system would fail and where there is no currently available solution that provides reliable dispensing. FIGS. 4 & 5 show this, where components which correspond to those of the earlier examples are numbered identically.

Figure 6:
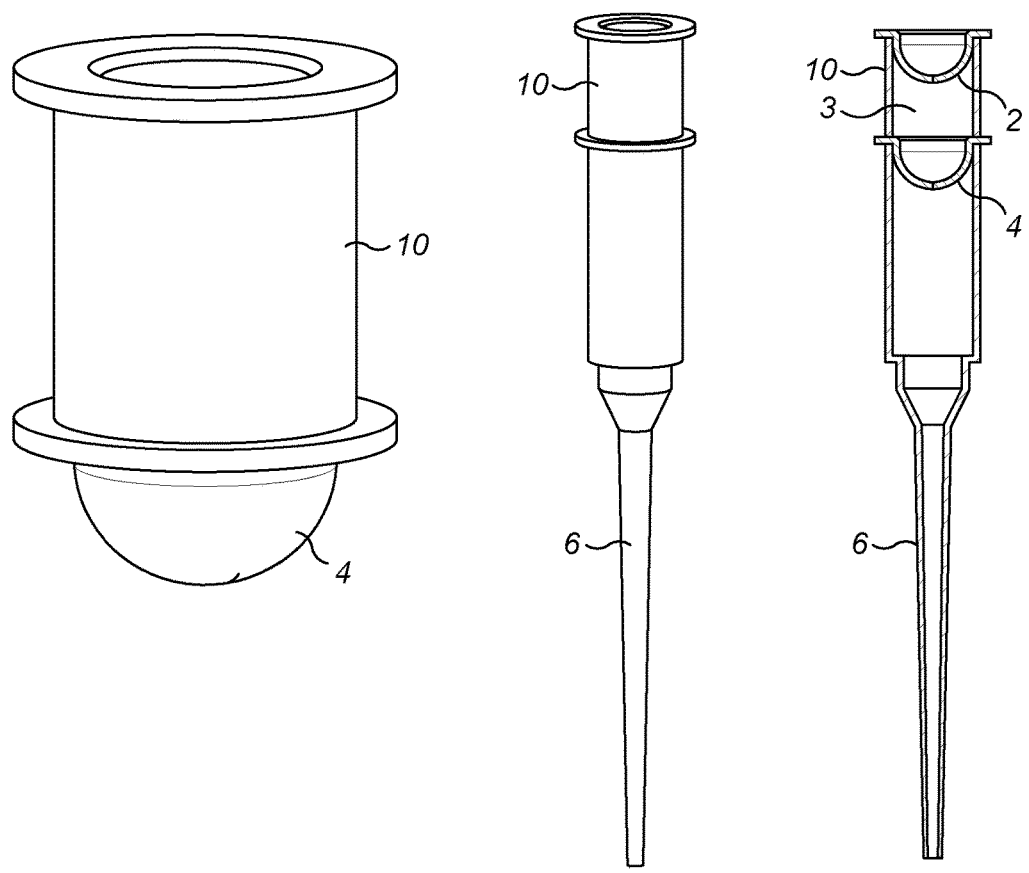
FIGS. 6 and 7 show a further example chamber arrangement that may be employed in the present invention.

FIG. 6 is yet a further example of the invention where the two cooperating valves 2,4 are separated by a compliant tubular structure 10 to form the chamber 3. The volume of the chamber 3 can be altered by forcing the valves 2,4 towards each other causing the tubular structure 10 to compress and thus reduce the effective volume of the chamber 3 between the two valves 2,4, forcing fluid out of the dispense valve 4. Relaxing the force between the valves 2,4 allows the compliant structure 10 to recover, closing the dispense valve 4 and allowing fluid to be drawn into the chamber 3 in readiness for a subsequent dispense. Alternatively, the volume of the compliant chamber 3 may be reduced by compressing transversally the wall of the tubular structure 10.

Figure 7:
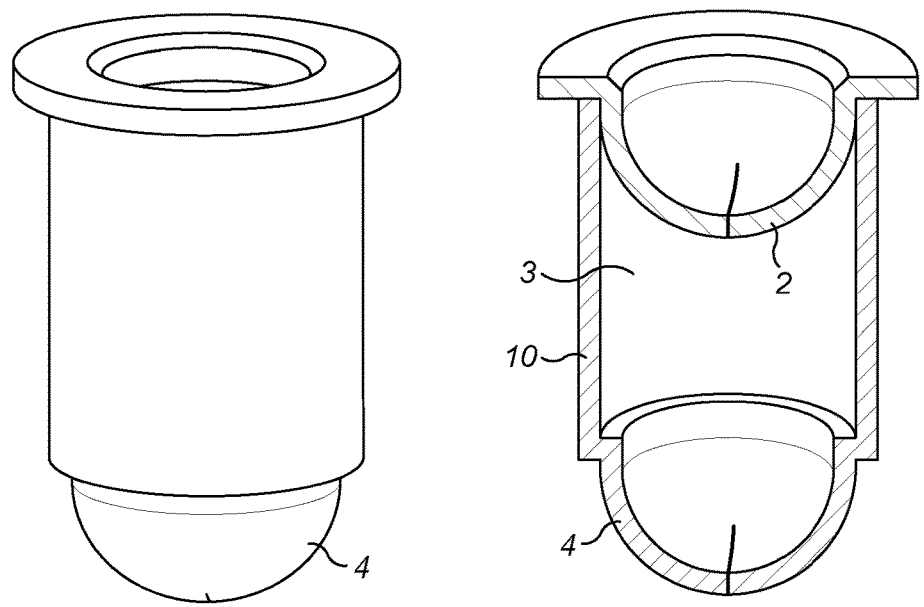

The compliant tubular structure 10 described above may also be incorporated into either of the valves 2, 4 as shown in FIG. 7.

Figure 8:
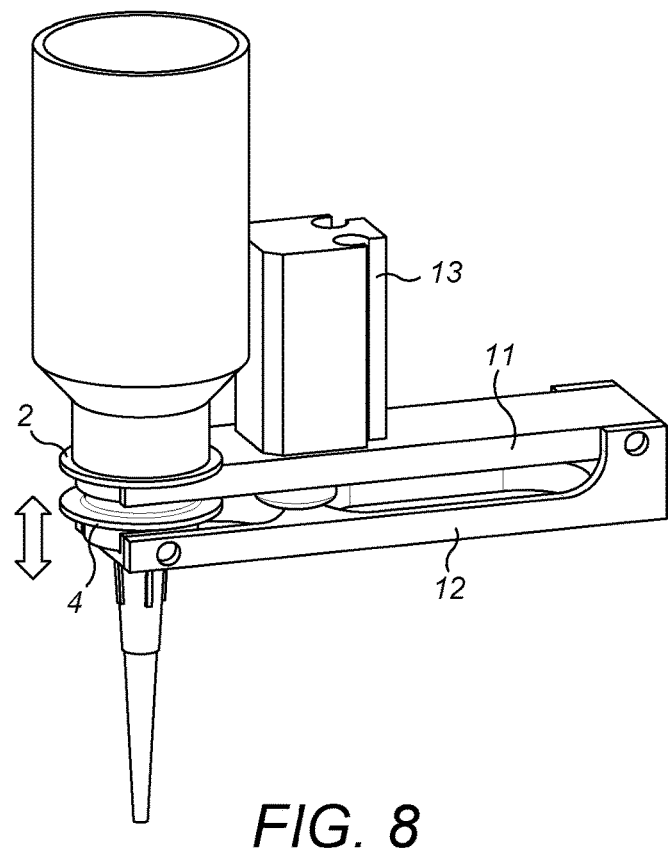
FIG. 8 shows by way of illustration an exemplary implementation of a system complete with mounting and actuator.

The system, by way of example, may be configured as shown in FIG. 8. One part of the valve system (in the illustration the upper valve 2) is rigidly mounted to support element 11 and the dispense valve is connected to a movable element 12 which in turn is movably connected to the support element 11. An actuator 13 links the support element 11 to the movable element 12 in such a manner that motion generated by the actuator 13 causes the support element 11 and the movable element 12 move relatively thus causing the valves 2 add 4 also to move relative to each other as previously described. The actuator 13 may be any prime mover including but not exclusively a solenoid, a pneumatic actuator, a piezo electric device or a manually actuated spring driven device.

Dispense volume may be controlled by altering the amount of energy input into the system. For example, a wide range of droplet volumes can be created by varying the drive voltage of an actuating solenoid device (not shown) acting as a dispensing control actuator. Effectively, the droplet volume dispensed may be controlled by altering the amount of energy input into the system either through the magnitude or duration of the force applied to the dispenser.

The system of the invention is capable of non-contacting droplet dispense and thus may deliver droplets over a full range of orientations (vertical, horizontal, inverted).

Figure 10:
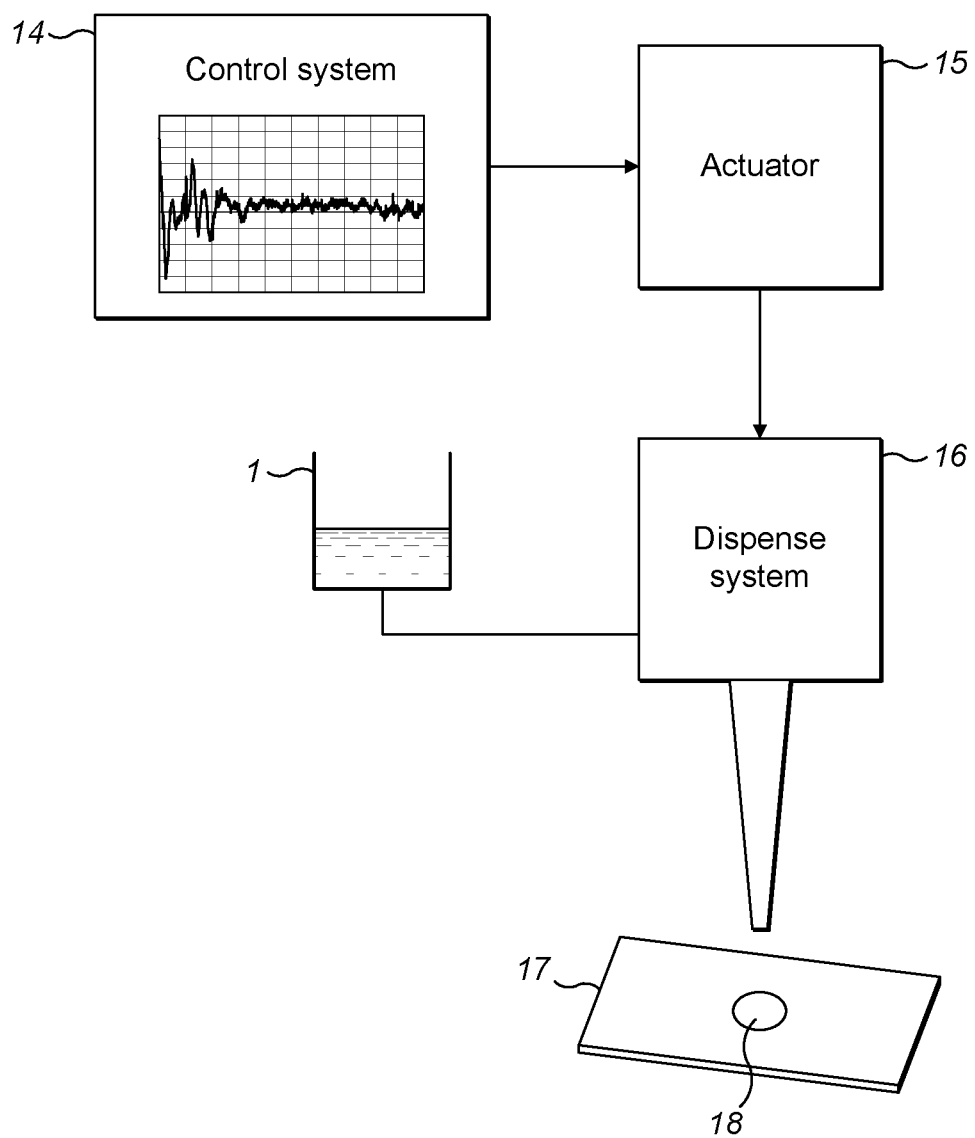
FIG. 10 shows a system layout including a controller in addition to the dispense system and reservoir.

FIG. 10 shows a complete droplet dispensing system comprising a control system 14 with an actuator 15 controlled by the control system 14, the fluid reservoir 1 and the dispense system 16 delivering a droplet 17 on to a substrate 18. It should be apparent to one skilled in the art that the control system may be an electronic system or a simple hand operated mechanical controller capable of delivering an impulse of energy into the system. Similarly, the actuator could be an electrical motor, solenoid or a simple spring. The ability to customise the design of the dispense system to optimise its performance to suit a variety of applications. Already mentioned is the ability of the system to dispense difficult to handle materials such as cyanoacrylate adhesives. The system is equally applicable to dispensing other fluids where non-contact droplet dispensing is required, for example:
  Hand operated mechanically actuated droplet dispenser for eye drops.
  Droplet dispenser for medical adhesive sutures, potentially hand operated mechanically actuated or electronically controlled and actuated.
  Hand operated mechanically actuated droplet dispenser for consumer adhesive dispensing.

The invention claimed is:

1. A droplet dispenser comprising a chamber with a fluid inlet valve and a fluid outlet valve, the chamber being arranged such that a chamber volume changes in use to cause fluid to be alternately drawn into the chamber through the fluid inlet valve then subsequently expelled from the chamber through the fluid outlet valve to dispense a droplet, the droplet dispenser further comprising:
  a control actuator arranged to apply a driving force to the droplet dispenser to dispense the droplet, wherein the control actuator comprises a solenoid, a pneumatic actuator, a piezo electric device, an electric motor or a manually actuated spring driven device; and a control system to vary a magnitude or a duration of the driving force applied by the control actuator to thereby vary a volume of the droplet that is dispensed by the droplet dispenser, wherein the volume of the droplet dispensed in a single dispensing is proportional to at least one of the magnitude or the duration of the driving force, and wherein the chamber includes walls that comprise elastomeric material such that the volume of the chamber changes by elastic deformation of the elastomeric material.

2. The droplet dispenser according to claim 1, wherein the fluid inlet valve and the fluid outlet valve slide relative to one another to change the volume of the chamber.

3. The droplet dispenser according to claim 2, further comprising a fluid reservoir connected to the fluid inlet valve.

4. The droplet dispenser according to claim 2, further comprising a dispensing tip connected to the fluid outlet valve.

5. The droplet dispenser according to claim 2, wherein each of the fluid inlet valve and the fluid outlet valve comprises at least one of: a one-way ball valve assembly and an elastomeric slit valve.

6. The droplet dispenser according to claim 2, wherein the magnitude of the driving force is between about 25 g and 100 g and the duration of the driving force is between about 5 ms and 500 ms.

7. The droplet dispenser according to claim 2, wherein the control system is arranged to vary the magnitude of the driving force applied by the control actuator to eject the droplet in a non-contact manner.

8. The droplet dispenser according to claim 1, wherein the fluid inlet valve and the fluid outlet valve are formed as a single component with no separate moving parts, wherein the fluid inlet valve and the fluid outlet valve are elastomeric slit valves.

9. The droplet dispenser according to claim 1, further comprising a fluid reservoir connected to the fluid inlet valve.

10. The droplet dispenser according to claim 9, further comprising a dispensing tip connected to the fluid outlet valve.

11. The droplet dispenser according to claim 9, wherein the control system is arranged to vary the magnitude of the driving force applied by the control actuator to eject the droplet in a non-contact manner.

12. The droplet dispenser according to claim 1, further comprising a dispensing tip connected to the fluid outlet valve.

13. The droplet dispenser according to claim 1, wherein each of the fluid inlet valve and the fluid outlet valve comprises at least one of: a one-way ball valve assembly and an elastomeric slit valve.

14. The droplet dispenser according to claim 1, arranged to dispense fluids having a viscosity ranging from about 1 Cp to about 700 Cp.

15. The droplet dispenser according to claim 1, wherein the control system is configured to vary a drive voltage applied to said control actuator to vary at least one of the duration or the magnitude of the driving force applied to the droplet dispenser.

16. The droplet dispenser according to claim 1, wherein the magnitude of the driving force is between about 25 g and 100 g and the duration of the driving force is between about 5 ms and 500 ms.

17. The droplet dispenser according to claim 1, wherein the control system is arranged to vary the magnitude of the driving force applied by the control actuator to eject the droplet in a non-contact manner.

18. The droplet dispenser according to claim 1, wherein the walls comprise a tubular structure which is arranged to separate the fluid inlet valve and the fluid outlet valve.

19. The droplet dispenser according to claim 18, wherein the droplet dispenser is arranged such that the volume of the chamber is altered by the control actuator forcing the fluid inlet valve and the fluid outlet valve towards each other and compressing transversally the walls of the tubular structure, thereby causing the tubular structure to compress to reduce an effective volume of the chamber.

20. A droplet dispensing system comprising:

a control system;

an actuator electrically controlled by the control system to apply a driving force to a support element;

a fluid reservoir containing a fluid;

a chamber functionally connected to the fluid reservoir, wherein the chamber is functionally attached to the support element, the chamber comprising:

elastomeric walls arranged in a tubular structure, a fluid inlet valve, and a fluid outlet valve, wherein, in use, the actuator applies the driving force to the support element to increase a distance between the fluid inlet valve and the fluid outlet valve, thereby increasing a chamber volume and causing the fluid in the fluid reservoir to be drawn into the chamber through the fluid inlet valve while the fluid outlet valve remains closed, wherein, after the fluid is drawn into the chamber, the actuator applies the driving force to the support element to decrease the distance between the fluid inlet valve and the fluid outlet valve, thereby decreasing the chamber volume and causing at least some of the fluid within the chamber to be dispensed from the chamber through the fluid outlet valve as an individual droplet while the fluid inlet valve remains closed, wherein a volume of the individual droplet is proportional to a magnitude of the driving force applied by the actuator to the chamber, and wherein the control system is configured to vary a drive voltage applied to said actuator to vary the magnitude of the driving force to control the volume of the individual droplet.

\* \* \* \* \*